(12) United States Patent
Heipel et al.

(10) Patent No.: US 10,195,938 B2
(45) Date of Patent: Feb. 5, 2019

(54) CLUTCH SENSOR WITH WAKE UP SWITCH

(71) Applicant: KSR IP Holdings, LLC, Wilmington, DE (US)

(72) Inventors: Derreck Robert Heipel, Ridgetown (CA); Zoe Zhu, Kitchener (CA); Rocky Sen, London (CA)

(73) Assignee: KSR IP HOLDINGS LLC, Wilmington, DE (US)

( * ) Notice: Subject to any disclaimer, the term of this patent is extended or adjusted under 35 U.S.C. 154(b) by 0 days.

(21) Appl. No.: 15/215,817

(22) Filed: Jul. 21, 2016

(65) Prior Publication Data
US 2017/0021725 A1 Jan. 26, 2017

Related U.S. Application Data

(60) Provisional application No. 62/194,899, filed on Jul. 21, 2015.

(51) Int. Cl.
G01D 5/20 (2006.01)
B60K 23/02 (2006.01)
G01B 7/30 (2006.01)
G01D 5/14 (2006.01)
B60K 26/02 (2006.01)

(52) U.S. Cl.
CPC .............. B60K 23/02 (2013.01); G01B 7/30 (2013.01); G01D 5/145 (2013.01); G01D 5/2046 (2013.01); B60K 2026/022 (2013.01); B60W 2420/50 (2013.01)

(58) Field of Classification Search
CPC .......... B60K 23/02; G01B 7/30; G01D 5/145; G01D 5/2046
See application file for complete search history.

(56) References Cited

U.S. PATENT DOCUMENTS

| 5,321,980 A * | 6/1994 | Hering | F02D 9/02 123/361 |
|---|---|---|---|
| 6,318,208 B1 | 11/2001 | Thongs, Jr. et al. | |
| 6,515,473 B2 * | 2/2003 | Pfaffenberger | F02D 11/106 324/207.2 |
| 8,240,230 B2 * | 8/2012 | Peniston | B60K 26/021 324/207.12 |
| 8,884,612 B2 * | 11/2014 | Hofmockel | F02D 11/106 324/207.2 |
| 2003/0080706 A1 * | 5/2003 | Waite | G05G 1/405 318/551 |
| 2005/0223841 A1 | 10/2005 | Lee | |
| 2012/0056739 A1 | 3/2012 | Lee et al. | |
| 2015/0070003 A1 | 3/2015 | Elliott et al. | |
| 2015/0301084 A1 * | 10/2015 | Elliott | G01D 5/20 324/207.15 |

* cited by examiner

Primary Examiner — Vicky A Johnson
(74) Attorney, Agent, or Firm — Dinsmore & Shohl LLC

(57) ABSTRACT

A pedal assembly having a pedal pivotally secured to a housing. A sensor is fixed to the housing at the pivot, the sensor including first and second components. A member is mounted to the pivot and slaved to the pedal in proximity to the sensor, the member including a coupler and an activating component. Upon pivotal rotation of the member relative to the sensor, the coupler communicating with the first sensor component to generate an output indicative of an angular position of the pedal relative to the housing. The activating component communicates with the second sensor component to function as a wakeup switch for the sensor.

12 Claims, 7 Drawing Sheets

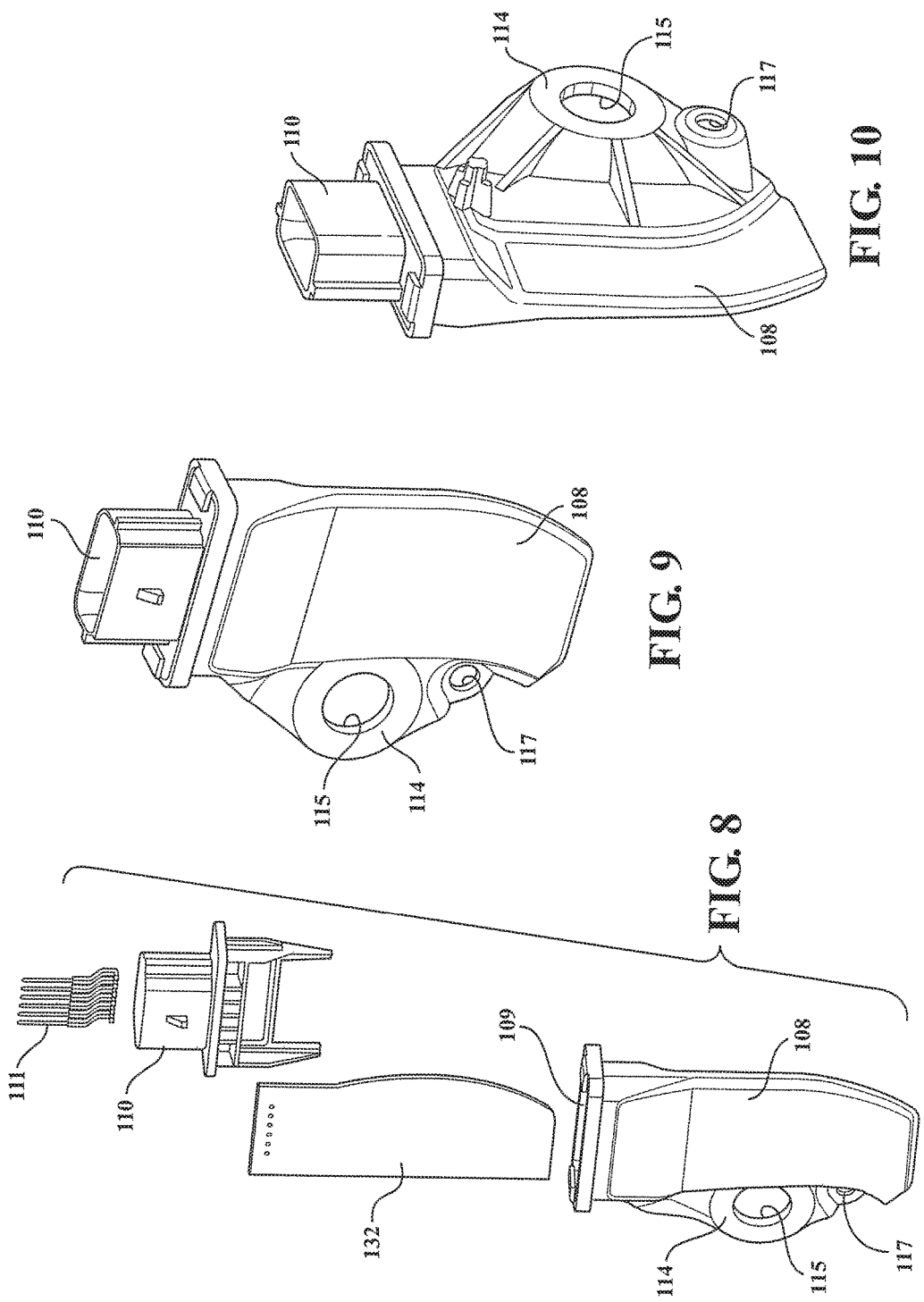

CLUTCH SENSOR WITH WAKE UP SWITCH

CROSS-REFERENCE TO RELATED APPLICATIONS

This Application claims the benefit of U.S. Provisional Application 62/194,899 filed on Jul. 21, 2015, the contents of which are incorporated herein in its entirety.

FIELD OF THE INVENTION

The present invention relates generally to clutch assemblies. More particularly, the present invention relates to a clutch assembly having an integrated rotational sensor with a wake up switch.

BACKGROUND OF THE INVENTION

Rotational sensors are generally known in the art hen used with pedal assemblies. However, in an effort to conserve energy, wake up sensors are desirably provided connected to the pedal assemblies to wake up the sensor (or other vehicle components).

Inductive sensors are used as position sensors in vehicles. Inductive sensors detect the position of a target by measuring the mutual inductance between a target and a sensing coil. Compared to other magnetic position sensors, inductive sensors are more cost effective because they do not need a magnet and instead use an electromagnetic coil. Inductive sensors are also desirable to use in vehicles and are generally reliable.

Accordingly, there exists a need in the art to provide a sensor assembly having both a wake up switch and a rotational sensor combined into one unit for cost and packaging savings.

SUMMARY OF THE INVENTION

The present invention discloses a pedal assembly having a pedal pivotally secured to a housing. A sensor is fixed to the housing at the pivot, the sensor including first and second components. A member is mounted to the pivot and slaved to the pedal in proximity to the sensor, the member including a coupler and an activating component. Upon pivotal rotation of the member relative to the sensor, the coupler communicating with the first sensor component to generate an output indicative of an angular position of the pedal relative to the housing. The activating component communicates with the second sensor component to function as a wakeup switch for the sensor.

In a further variant, a coupler is recited for use with a rotor inductive sensor, the sensor having first and second components and being fixed to a housing, a pedal pivotally attached to the housing. The coupler includes a member adapted to engage the sensor assembly at a pivot location thereof, the member including a coupler and an activating component. Upon pivotal rotation of the member relative to the sensor, the coupler is adapted to communicate with the first sensor component to generate an output indicative of an angular position of the pedal relative to the housing. The activating component communicating with the second sensor component to function as a wakeup switch for the sensor.

BRIEF DESCRIPTION OF THE DRAWINGS

Reference will now be made to the attached drawings, when read in combination with the following detailed description, wherein like reference numerals refer to like parts throughout the several views, and in which:

FIG. 8 illustrates a perspective exploded view of the sensor assembly including the outer body, inserted PCB board, plug connector and multi-pin connector components;

FIG. 9 illustrates a perspective front view of the sensor assembly;

FIG. 10 illustrates an alternative perspective view of the sensor assembly; and

DETAILED DESCRIPTION OF THE PREFERRED EMBODIMENTS

As will be described with reference to the attached illustrations, the present invention discloses a pedal assembly which, in one non-limiting variant, employs a clutch angle sensor with an integrated wake up feature and which includes a clutch pedal pivotally mounted to a housing, where a rotational angle of pedal is measured by the sensor. As will be further described, a sensor activating flag or member is provided connected to the pedal arm and which is movable over a fixed sensor. The sensor is fixed to the housing and includes both the clutch angle rotational sensor along with a separate wake up feature. In this fashion, the sensor combines both switches on one sensor mounted directly to the pedal housing at the pivot point of the pedal.

Figure 1:
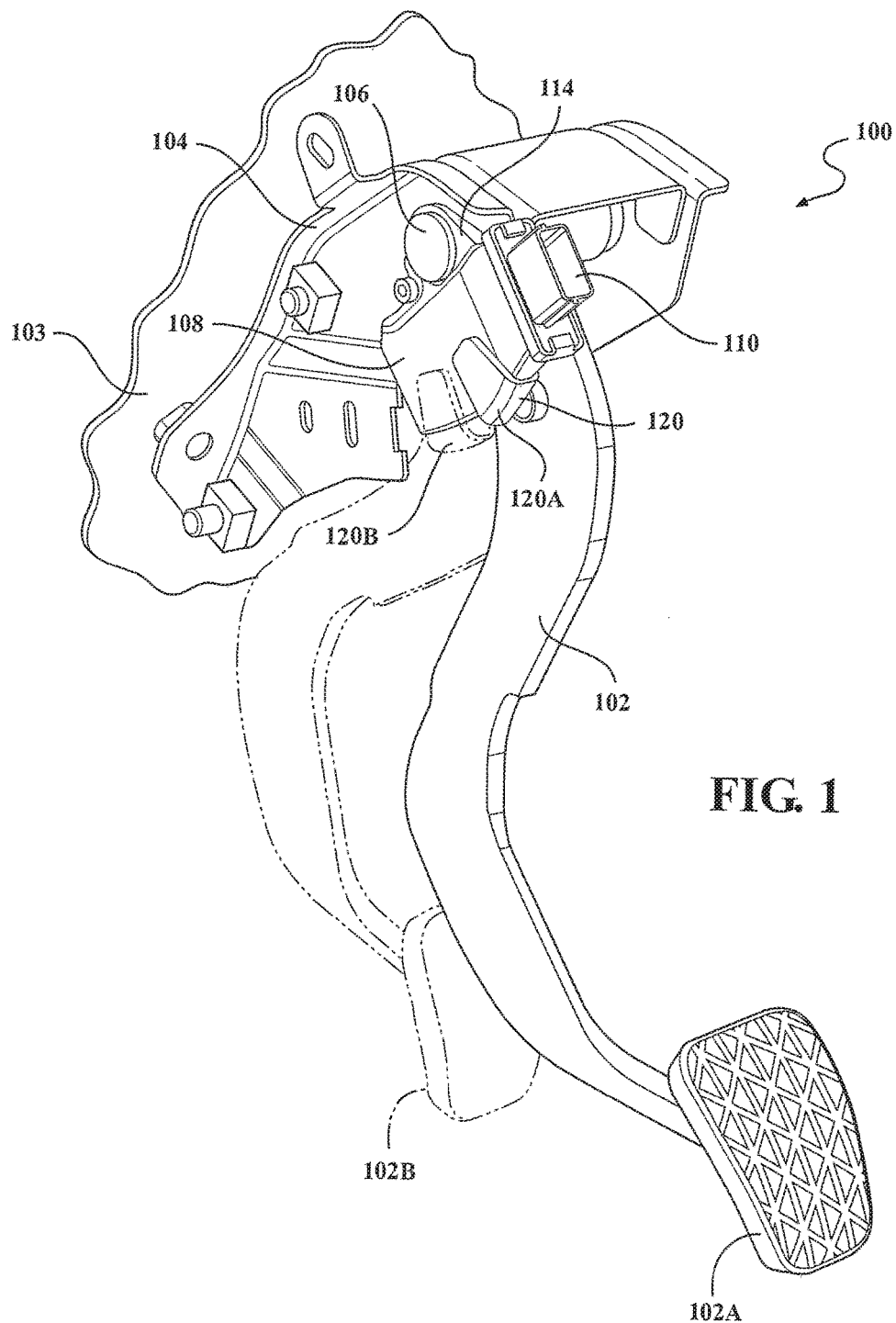
FIG. 1 illustrates a perspective view of the pedal assembly in a first position and a second position.

As shown in FIG. 1, a pedal assembly is generally shown at 100 and includes a pedal arm 102 (such as which can in one non-limiting application constitute a clutch pedal) mounted to a housing 104, such as which is further typically affixed to a floor proximate location (see at 103) of the vehicle where the foot controls are located. The pedal arm 102 includes a tread portion which rotates about a main pivot point (between un-depressed and fully depressed positions 102A and 102B) via a main pin 106 connected to the housing 104. A sensor assembly includes a cavity defining body 108

(see in each of FIGS. 1, 2 and 6-10) and is connected to the pivot point and is fixed to the housing.

As best shown in FIG. 8, the sensor outer body 108, such as which can include a molded plasticized material with an open top accessible recess (see at 109 in FIG. 8) receives an insertable sensor PCB board (depicted at 132). A plug connector 110 is provided and it attachable over the open top of the sensor body 108, a multi-pin connector 111 engaging within an open interior of the plug connector 110 for receiving a separate cable (not shown) in communication with an output of the PCB board 132.

Figure 7:
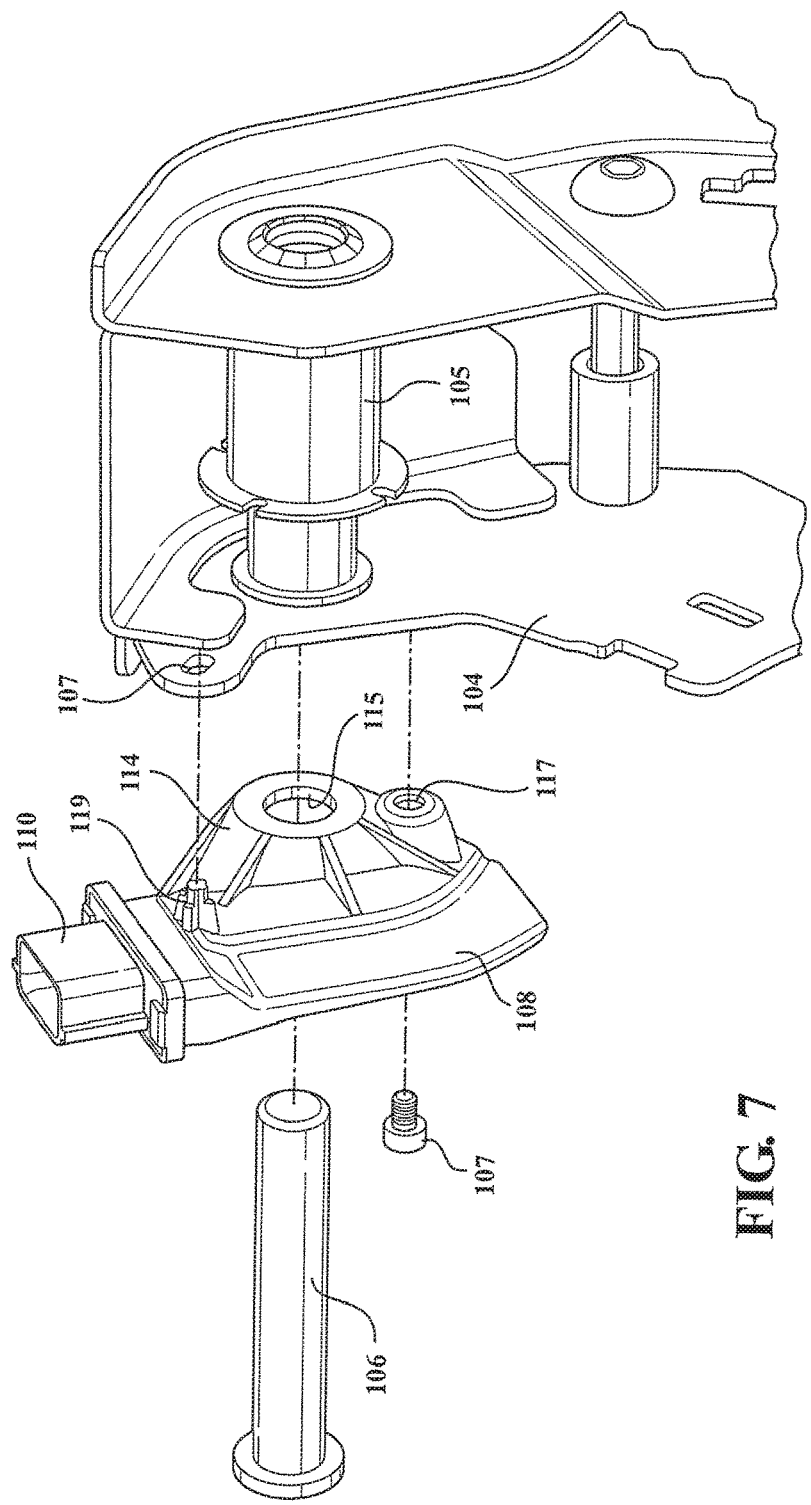
FIG. 7 illustrates a partially exploded, perspective view of the sensor assembly affixed to the housing via the main and secondary affixing pins.

As further again shown in the exploded view of FIG. 7, a mounting portion 114 of the sensor body 108 depicts an inner aperture defined rim, at 115, this facilitating installation of the mounting pin 106 for securing to the housing 104 (via a collar mounting location 105 associated with the housing). Secondary pin 107 is shown and affixes through a further interior defined rim aperture 117 in the sensor body 108, for affixing the same in non-rotating fashion to the housing 104. A two-way locator feature 119 projects from a rear of the sensor body 108 and seats through a receiving aperture 113 defined in an edge wall location of the housing 104.

A coupler 120 (this also termed as a sensor activation flag or activation member) and which is mounted to the pivot point via the pin 106, in such a fashion to be fixed to the pedal arm 102 and rotating therewith. FIG. 1 again illustrates the pedal arm tread portion in the first position 102A and the second position 102B, with the member 120 rotating with the pedal arm 102 in slaved fashion such that the member is also shown in a first position 120A and a second position 120B.

Figure 5:
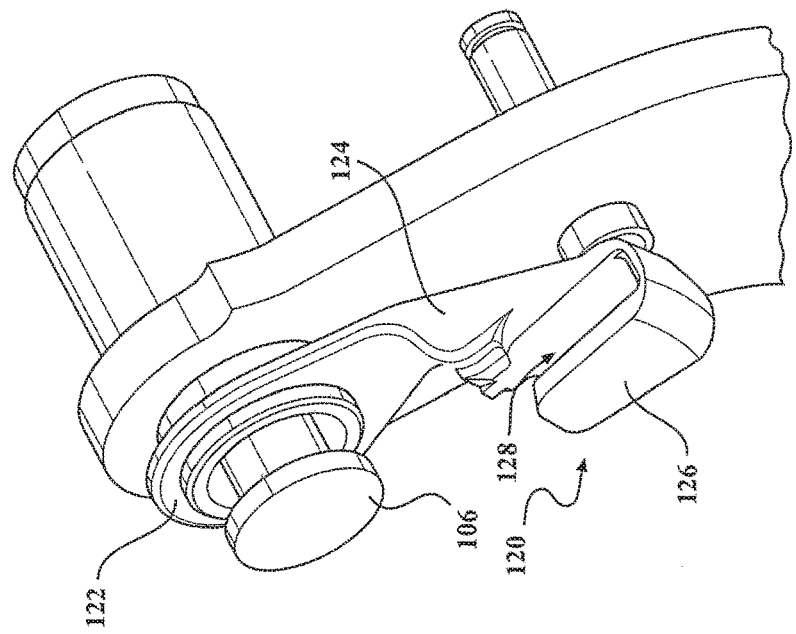
FIG. 5 illustrates a close up perspective w of the installed flag connected to the pedal arm.

As best depicted in FIG. 5, the coupler member 120 is rotatably mounted to the main pivot point (via main pin 106) by means of a rounded and interior aperture defining connector end 122 forming an integral portion of the member 120. As with the sensor body 108, the coupler member 120 can include a plastic base material and, in the illustrated embodiment, includes a first connector end 122 generally circular in shape and allowing for a pivot pin 106 constituting the pivot point to extend therethrough and connect to a receiving aperture configured in the housing 104 (see again as shown in exploded FIG. 7 associated with upper collar mount 105 and which is hidden from view).

Figure 3:
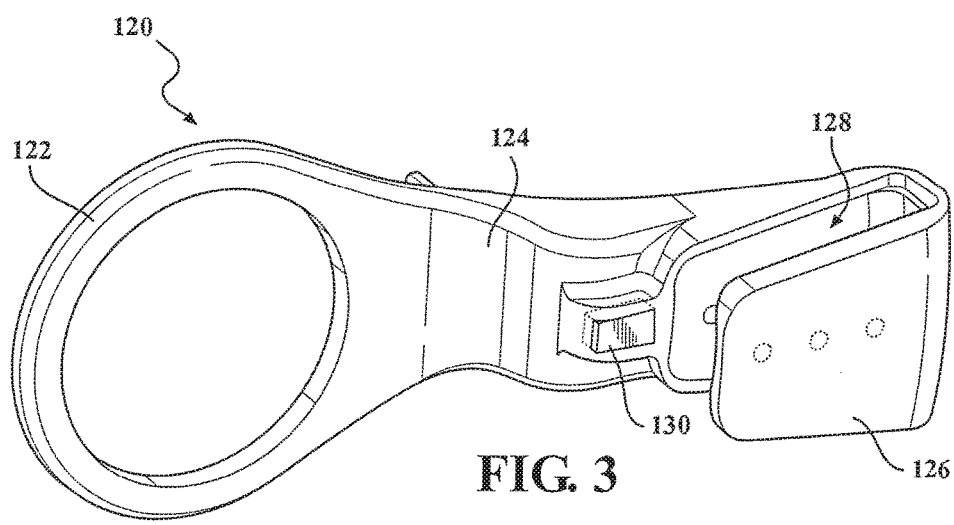
FIG. 3 illustrates a perspective view of the flag of the present invention having both an over-molded magnet activating the wake up switch and an overmolded aluminum coupler activating the inductive sensor.

As best shown in FIG. 3, the member 120 includes a middle portion 124 and reverse bent end portion 126 (opposite the connector end 122) and which establishes an opposite extending "U" shaped end profile 128. The inwardly facing "U" shaped surfaces associated with the "U" shaped end profile 128 can further include an over-molded aluminum, about which is over-molded the plastic outer material.

As shown, the over-molded material extends over both an activating component, in the illustrated example being a magnet 130, such as including but not limited to an aluminum-nickel-cobalt (or Alnico) construction, positioned at an intermediate and inwardly facing location of the member 120, and the "U" shaped coupler 128. The selection of a "U" shape for the coupler is intended to compensate any side-to-side misalignment of the sensor 108, such resulting from lateral misalignment of the pedal 102 with the objective being to maintain a spacing between the member 120 and the sensor 108 in order establish an operational inductive range (as will be hereinafter described).

As further shown, the "U" shaped configuration of the inductive coupler end 128 defined by the reverse extending and outwardly spaced end portion 126 of the member 120 is such that the U-shaped portion and the coupler extend over and about opposite outer and interconnected edge surfaces of the sensor 108. As the pedal arm 102 and the member 120 rotate, the U-shaped profile 128 of the member 120 travels over the sensor (typically in a desired spatial but non-contacting fashion) and in order to connect with the sensor components on the sensor board (again via a desired inductive range established therebetween).

In operation the over-molded and aluminum "U" shaped inward facing profile 128 of the pivoting coupler member 120 activates the inductive sensor components of the present assembly and which is reflected as a variable position output. The coupler 120 interacts with sensor board components located on a PCB board 132 associated with the sensor 108 and, in one non-limiting example, the sensor 108 includes the PCB board 132 having respective sensor components 134 and 136, with the sensor component 134 being activated by the magnet 130 and the (overall) sensor component 136 directly communicating with the aluminum pivoting "U" profile 128 of the coupler 120.

As previously described, the coupler 128 and the magnet 130 are typically over-molded, with the material used to over-mold the components typically being a plastic, plastic-like or polymer type material, It is further understood that any other material providing similar properties can also be used in substitution.

In operation, the activation component/over-molded magnet 130 communicates to the sensor element 134 positioned on the sensor board 132 of the sensor outer body 108, such that the over-molded magnet 130 and the sensor component 134 collectively act as the wake up switch for the sensor. This switching resulting from the passing of the magnet 130 across the sensor component 134 operates under the magnetic "Hall Effect".

A Hall effect sensor is a transducer that varies its output voltage in response to a magnetic field, such that these sensors are used for proximity switching in which the sensor is combined with circuitry which allows for the device act in a digital (on/off) mode. Alternative applications for such sensors include, but are not limited to, any of positioning, speed detection and current sensing. In its simplest farm, the sensor operates as an analog transducer, directly turning a voltage. With a known magnetic field, its distance from the Hall plate can be determined and the relative position of the magnet can be deduced.

Figure 2:
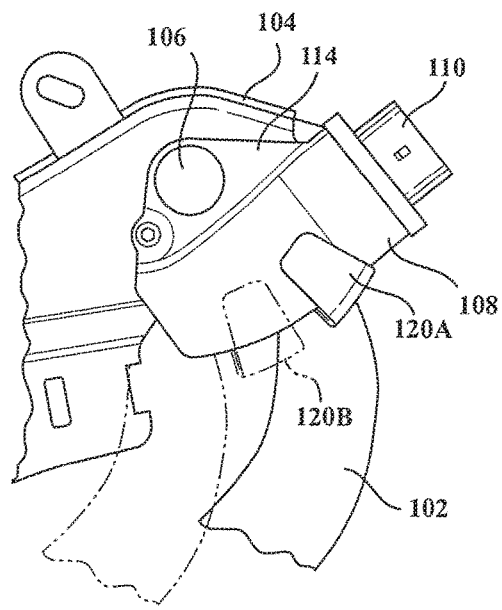
FIG. 2 illustrates a close up view of the sensor in an assembled position in both a first position and a second position.

The coupling member (also again termed a flag) 120 is mounted close to the pivot point 106 to minimize lateral deflection influence of a long pedal arm 102. As best shown in FIG. 2, two mounting locations are placed close together to allow the member 120 to flex under extreme loading conditions. While maintaining of a minimum spacing between the coupler and the sensor is preferred, occasional contact between the U-shaped profile 128 of the coupler member 120 and the sensor body 108 is acceptable.

The sensor PCB board 132 is provided within the housing of the sensor 108, such as shown in the exploded view of FIG. 8. As previously described, the sensor is preferably contactless and inductive relative to the pivoting member and coupler, which can further exhibit any desired rotational range, such as not limited to 35 degrees between pivoted positions 120A and 120B.

Figure 4:
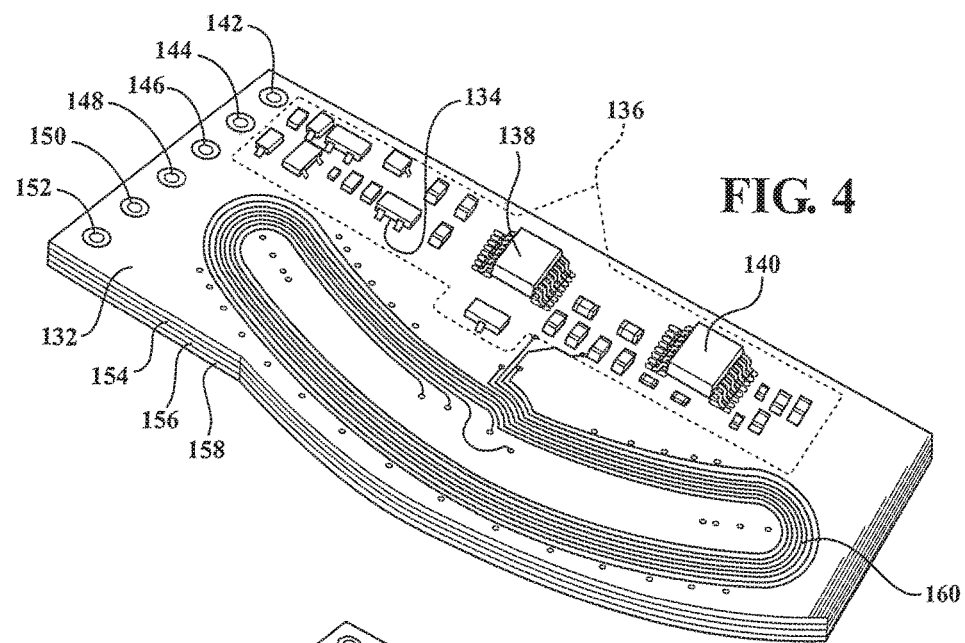
FIG. 4 illustrates a perspective view of the sensor board incorporating the wakeup switch activating component and the inductive sensor operative components.

Referring again to FIG. 4, an uppermost layer 132 of the sensor board integrates the each of the Hall effect wake up switch sensor component 134, this depicted among a number of surrounding components (generally referenced by box 136) making up the inductive sensor portion of the board 132. The two main sub-components of the overall inductive sensor component include a pair of ASIC chips (see at 138 and 140) which interact with the supporting circuitry components, in the form of a collection of resistors, capacitors and the like within the ordinary skill of one in the relevant art, this in order to provide the processing and signaling output functionality of the rotary inductive sensor.

A plurality of contact ports are associated with the edge of the board 132 and include each of 12V power input 142 and S/O 144, this being an output pin for the Hall switch which provides switch output to the external vehicle processor to the inductive positional sensor on the clutch pedal when the pedal passes the switching point (as further described below in reference to FIG. 11). Additional contact ports include each of Output 1 (at 146), VCC (power pin of inductive sensor) 148, Ground (GND) 150 and Output 2 (at 152). The dual outputs 146 and 152 are further understood to be redundant as a safety feature of the inductive sensor assembly.

As previously described, the sensor assembly can be adapted for both steel and plastic bracket environments. The sensor PCB board 132 further includes a plurality and set of coils, including each of a receiving coil and an exciting coil within the board, and which is/are adapted to communicate with any external electronic control unit or other PC operated device.

Figure 4A:
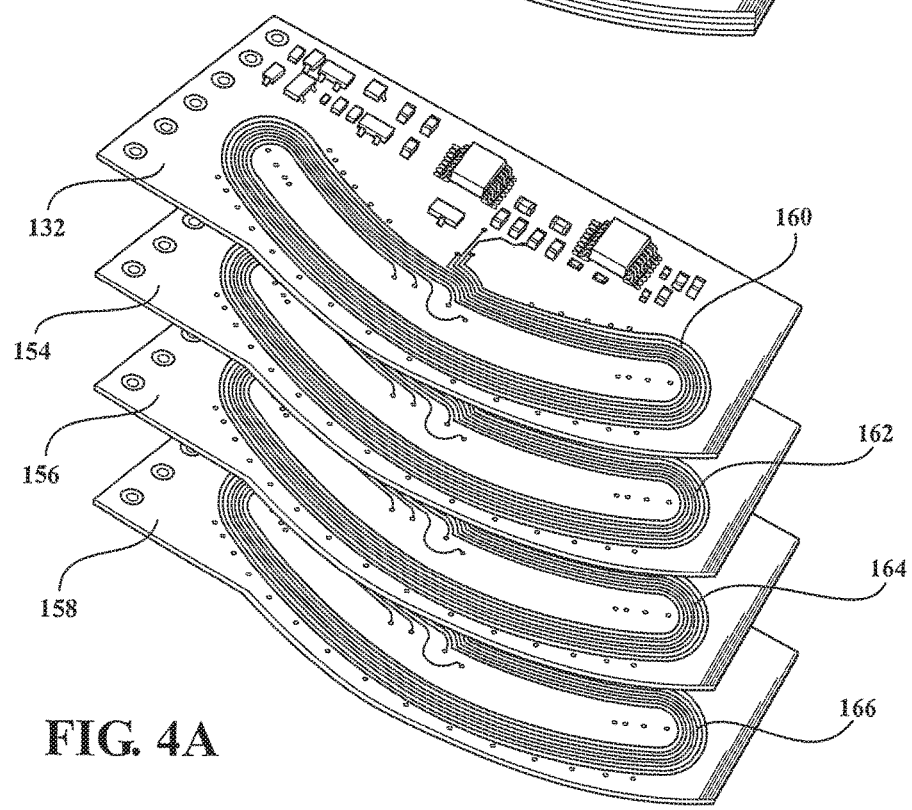
FIG. 4A is an exploded illustration depicting one non-limiting construction of the sensor board and which includes top and bottom most layers incorporating an exciting coil pattern, with a further pair of middle layers incorporating receiving coil patterns, the layers being assembled so that the coil patterns overlap and extend in an arc consistent with the pivoting of the overlaying "U" shaped coupler.
Figure 6:
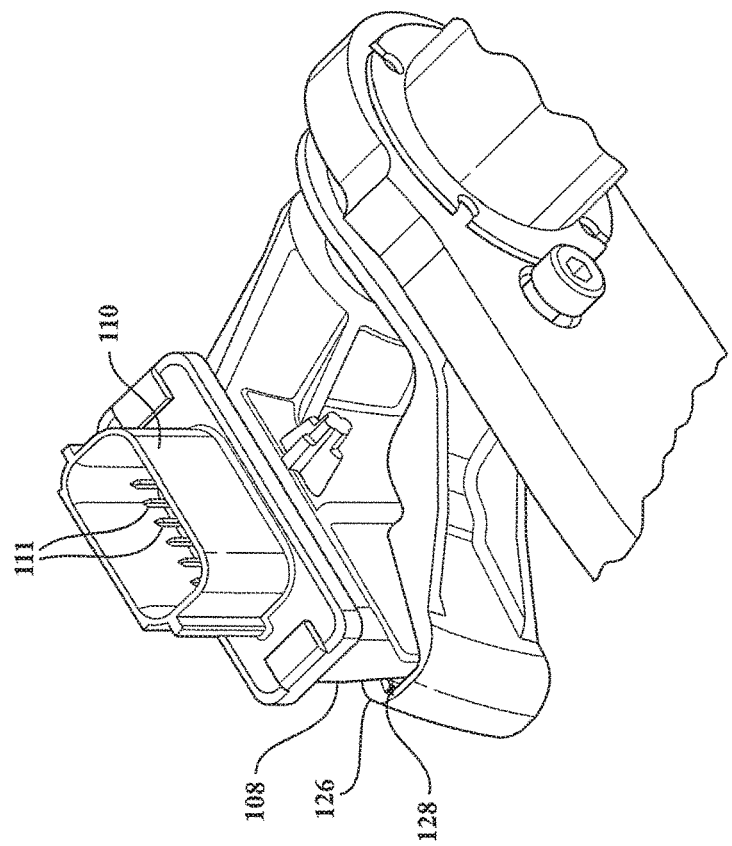
FIG. 6 illustrates a close up perspective view of the installed flag and sensor assembly connected to the pedal arm and housing.

Referring specifically to FIG. 4A, an exploded illustration depicts one non-limiting construction of the sensor board which is provided as a plurality of stacked layers, a top or uppermost again being shown at 132, with successive underneath layers depicted at each of 154, 156 and 158. As further shown, the wake up switch component 134 and surrounding inductive sensor components 136 (e.g. ASIC chips 138/140) are all positioned upon the uppermost board 132.

As further shown, each of the layers 132, 154, 156 and 158 exhibit a similar size and outline, each further including a matching coil pattern (these understood to be projected upon the same area of each successively stacked layer so that they align in contacting fashion with one another). The coil patterns are shown at 160 for layer 132, at 162 for layer 154, at 164 for layer 156 and, finally at 166 for layer 158. Applying the principles of inductive sensing, each of the top 132 and bottom 158 positioned layers incorporate an exciting coil pattern (again depicted by patterns 160 and 166), with a further pair of middle layers (again at 154 and 156) incorporating receiving coil a (again at 162 and 164).

The layers are assembled so that the coil patterns 160, 162, 164 and 166 overlap and extend in an arc (such as an arcuate or pseudo-kidney shape as depicted) consistent with the pivoting travel of the overlaying "U" shaped portion 128 of the overall coupler flag or member 120, it being further understood that the cross section and shape of the coupler member and its "U" shaped end portion is dictated by the shape of the coil patterns on the stacked sensor boards. Without limitation, the sweep or pattern of the overlapping coil patterns can be modified to any other linear or non-linear configuration consistent with the configuration and travel of the associated coupler element 128.

It is also understood that the four tier or layer construction of the sensor boards depicted can also be modified to include other stacked configurations, and so that a desired overlapping arrangement of exciting and receiving coils is designed for accomplishing inductive sensing. This again takes into account maintaining of lateral spacing between the inside facing surfaces of the aluminum over-molded interior facing "U" profile 128 of the coupler and the opposite facing and interconnecting edge surfaces of the outer sensor body 108 containing the inductive sensor PCB board 132, again in order to retain inductive contact during the sweep of the coupler 120 across the overlapping exciting and receiving coils of the stacked PCB board array (the dual output signals 146 and 152 again being reflective of the safety aspect of the design which compensates for unintended lateral misalignment between the coupler arm and the sensor body which can result in one side of the "U" shaped coupler profile contacting the sensor body 108 or, more typically, being laterally outwardly spaced an excessive distance which may be disruptive of the inductive signal generated from that facing side of the "U" shaped profile.

Figure 11:
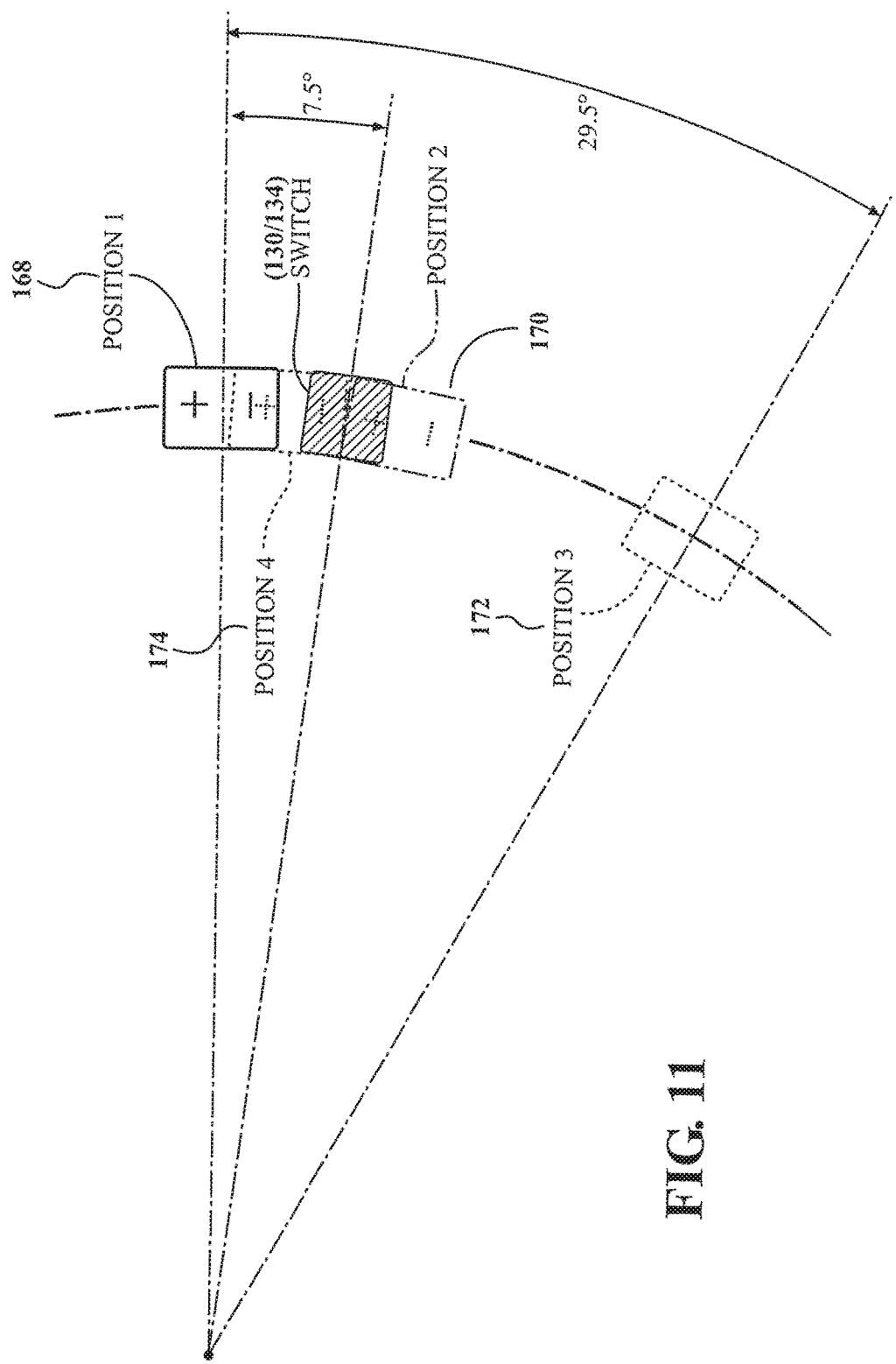
FIG. 11 provides a representative illustration of the ON/OFF operation of the magnet, via its switching positive/negative polarity, when passed over the sensor board mounted switch.

Applying the above explanation of the Hall effect sensor component 134, in combination with the coupler mounted magnet 130 operating as a wake up switch, FIG. 11 provides a representative illustration of the ON/OFF operation of the magnet 130, via its switching positive/negative polarity, when passed over the sensor board mounted switching/sensor component 134. In one non-limiting application, the switch 134 mounted to the sensor board 132 is provided with a low current draw (such designed to subsist for long periods of time of non-use without unnecessarily draining the vehicle's battery) and which, when activated by the switching polarity associated with the passing magnet 130, operates to wake up the remaining operative components 136 associated with the inductive sensor and the overlapping coil patterns (again 160-166) in proximity extending fashion to the "U" shaped aluminum coupler 128.

As shown, and in a first non-limiting application in which the sensor assembly is integrated into a clutch associated with a manual transmission vehicle, the magnet is shown in a first (switch off) position consistent with the clutch in an un-depressed condition, whereas the third magnet position corresponds to the clutch being fully depressed. Factoring in the positioning of the switch component 134 on the sensor board 132, a one-quarter range of depressed pedal/coupler travel (such as which can correspond in one non-limiting embodiment to 7.4 degrees) corresponds to the magnet passing over the switch component.

The polarity of the magnet 130 provides for the operation of the switch component 134, such that the positive and negative polarities are oriented in a vertical two dimensional plane as depicted in FIG. 11. Prior to depressing the pedal, the switch is depicted at initial position (Position 1) at 168.

In operation, and upon the positive pole of the magnet passing over the switch component 134 (again termed a Hall switch as described above), the switch turns on (Position 2 at 170). At this point, the sensor component 134 is activated and, via its pre-existing current input) provides power to the rest of the inductive sensor components 136 associated with the PCB board 132, thereby activating the inductive sensor function for the remainder of the pedal travel. This is depicted as further depressing positions two-three (Position 3 being shown at 172 and representing a fully-most depressed angled such as at 29.5 degrees of the pedal), and initial reverse or un-depressing Positions three-four (Position 4 depicted at 174 and coinciding in location with Position 2 (such as at 7.5 degrees) at which the reversing polarity of the magnet 130 is triggered as it returns to the initial un-depressed Position 1 (168).

Consistent with the above, and as the pedal is on the return stroke (i.e. being released so that it travels between fully depressed Position 3 (172), intermediate switching Position 4 (174), and fully un-depressed Position 1 (again at 168), the magnet 130 re-approaches the switch sensor 134 at the fourth position. At this point, the negative pole of the magnet passes over the switch, turning the switch 134 to the OFF position, and deactivating the inductive sensor, such operation being repeated every time the pedal is applied.

As is further understood in one operating environment, and with the key engaged with the vehicle ignition and the vehicle in the run position, the repeated ON/OFF switching polarity of the magnet typically occurs in the background without affecting the sensor. Once the key is removed from the run position and subsequently reinserted to restart the vehicle, the initial depressing of the clutch (pedal arm/coupler) from positions one to two again activates the low current drawing wake up switch, and thereafter the inductive sensor components, in a manner which instructs the remote vehicle processor (also termed as a BCM) to start the engine.

Without limitation, the rotational range of travel of the pedal and the associated end of the coupler can be modified (such again not limited to a 27.5° overall range with a 7.5° trigger location of the magnet passing over the switch sensor component), and can include other arc/pivot ranges. In one further non-limiting application, the contactless inductive sensor components can operate over a rotation range of 35° and contain the wake up function for the inductive sensor and related vehicle processor circuits. As further indicated, the sensor can be adapted for both metal and plastic bracket environments and the shaping of the sensor PCB board imprinted and overlapping (exciting/receiving) coil patterns can also be modified from that shown and, in combination with a redesign to the coupler member and its extending profile end, such as from the "U" shaped profile depicted, can include any of a myriad of other shapes and designs.

It is understood that applications requiring a solid state (Hall effect) micro switch can extend beyond a wakeup switch for any of a key or button start (ignition) of a vehicle, such occurring with minimal delay in particular instances of a button or key start without a key insert contact being present). The vehicle BCM processor can also be configured to distinguish an ignition key on condition from a crank request (button start only), or of triggering a passive key search (button start only). Functions which utilize the pedal angle sensor/coupler can, without limitation, include auto stop/stall (primary input for stopping, starting, stall recovery and functional safety), driveline state detection for initial start and functional safety), drive-ability (gear change, feed forward launch, etc.), hill launch assist, clutch protection, active hold, cruise control cancel, eClutch applications.

Having described our invention, other preferred embodiments will become apparent to those skilled in the art to which it pertains, and without deviating from the scope of the appended claims.

The invention claimed is:

1. A pedal assembly, comprising:
    a pedal pivotally secured to a housing;
    a sensor fixed to said housing at a pivot;
    said sensor including a switch component in communication with a position measurement component;
    a member mounted to said pivot and slaved to said pedal in proximity to said sensor;
    a magnet mounted to said member;
    a first activating position established upon said magnet traveling in a first direction and interacting with said switch component to wake said sensor by providing power to said measurement component to generate an output indicative of an angular position of said pedal relative to said housing; and
    a second deactivating position established upon said magnet traveling in a second direction, causing said switch component to deactivate said sensor by removing power from said measurement component.

2. The pedal assembly as described in claim 1, said sensor further comprising a PCB board supporting said switch component and said position measurement component.

3. The pedal assembly as described in claim 2, further comprising a plurality of coils including at least a receiving coil and an exciting coil incorporated into said PCB board and adapted to communicate with an external electronic control unit.

4. The pedal assembly as described in claim 2, further comprising an over molded plastic body surrounding said PCB board, a pin connector subassembly securing to an open end of said over molded plastic body in communication with said PCB board.

5. The pedal assembly as described in claim 1, said member further comprising a circular shaped end for supporting at said pivot.

6. The pedal assembly as described in claim 1, said member further comprising a coupler having a "U" shaped portion overlapping an extending edge of said sensor in a non-contacting fashion.

7. The pedal assembly as described in claim 1, further comprising an over molded plastic material applied to said member including said magnet.

8. The pedal assembly as described in claim 7, further comprising a rotational range established between said member and sensor.

9. The pedal assembly as described in claim 1, further comprising said sensor being supported at a first location to said pivot.

10. The pedal assembly as described in claim 1, further comprising said sensor providing an inductive variable position output.

11. The pedal assembly as described in claim 1, said sensor further comprising a clutch angle rotational sensor.

12. The pedal assembly as described in claim 1, said member further comprising first and second mounting locations for permitting flex in response to exerted loading conditions.

* * * * *